(12) United States Patent
D'Angelo et al.

(10) Patent No.: US 11,214,489 B1
(45) Date of Patent: Jan. 4, 2022

(54) CROSSFLOW SCRUBBING METHOD AND APPARATUS TO PRODUCE A PRODUCT SUCH AS POTASSIUM THIOSULFATE OR AMMONIUM THIOSULFATE

(71) Applicant: Ceres Technology LLC, Davie, FL (US)

(72) Inventors: Francine D'Angelo, Davie, FL (US); Joan Wright Manley, Kilgore, TX (US)

(73) Assignee: Ceres Technology, LLC, Davie, FL (US)

( * ) Notice: Subject to any disclaimer, the term of this patent is extended or adjusted under 35 U.S.C. 154(b) by 0 days.

(21) Appl. No.: 17/106,090

(22) Filed: Nov. 28, 2020

(51) Int. Cl.
   - *C01B 17/64* (2006.01)
   - *B01D 53/14* (2006.01)
   (Continued)

(52) U.S. Cl.
   CPC .......... *C01B 17/64* (2013.01); *B01D 53/1406* (2013.01); *B01D 53/1412* (2013.01); *B01D 53/1481* (2013.01); *B01D 53/1493* (2013.01); *B01D 53/185* (2013.01); *B01D 53/346* (2013.01); *B01D 53/502* (2013.01); *B01D 53/504* (2013.01); *B01D 53/78* (2013.01); *B01D 53/96* (2013.01); *B01D 2251/206* (2013.01); *B01D 2251/306* (2013.01); *B01D 2257/302* (2013.01)

(58) Field of Classification Search
   CPC ............ B01D 53/1406; B01D 53/1481; B01D 53/50; B01D 53/501; B01D 53/504; B01D 53/74; B01D 53/75; B01D 53/78; B01D 2251/206; B01D 2251/306; B01D 2257/302; B01D 2258/0283; B01J 2219/182

See application file for complete search history.

(56) References Cited

U.S. PATENT DOCUMENTS

| | | | | |
|---|---|---|---|---|
| 2,678,108 A | * | 5/1954 | Reidlaurances ... | B01D 53/0423 96/133 |
| 4,039,307 A | * | 8/1977 | Bondor ............ | B01D 53/74 96/235 |

(Continued)

FOREIGN PATENT DOCUMENTS

CN 205 598 897 U * 9/2016 ............. B01D 53/18

*Primary Examiner* — Timothy C Vanoy
(74) *Attorney, Agent, or Firm* — Harbin & Hein PLLC

(57) ABSTRACT

A method and a facility for wet-scrubbing sulfur dioxide to produce, for example, potassium thiosulfate or ammonium thiosulfate. The facility includes a multi-section vessel having multiple horizontally disposed stages where a preceding stage passes partially-scrubbed waste gas to a succeeding stage. Each stage has a scrubber mechanism to scrub waste gas with circulating fluid that successively reduces waste gas concentration before atmospheric discharge. The scrubber mechanism may include a packing to facilitate absorption of waste gas by the fluid, a sump disposed at the output of the stage to receive fluid as it drains from the packing, and a circulation pump to circulate fluid from the sump to its packing and to cascade at least a portion of the fluid back to a preceding stage. A portion of the fluid is extracted from the facility and reacted in a reaction vessel with a cation to produce ammonium thiosulfate or potassium thiosulfate.

29 Claims, 2 Drawing Sheets

(51) Int. Cl.
*B01D 53/18* (2006.01)
*B01D 53/34* (2006.01)
*B01D 53/50* (2006.01)
*B01D 53/78* (2006.01)
*B01D 53/96* (2006.01)

(56) References Cited

U.S. PATENT DOCUMENTS

| | | | |
|---|---|---|---|
| 4,170,546 A | 10/1979 | Frayer et al. | |
| 4,173,528 A | 11/1979 | Frayer et al. | |
| 4,405,593 A | 9/1983 | Schlauer et al. | |
| 5,403,568 A * | 4/1995 | Stowe, Jr. | B01D 53/504 423/243.08 |
| 6,059,962 A | 5/2000 | Alexandr et al. | |
| 6,451,268 B1 * | 9/2002 | Erdman | C01F 11/181 422/236 |
| 6,562,304 B1 * | 5/2003 | Mizrahi | B01D 53/14 422/171 |
| 6,733,660 B2 | 5/2004 | Pradhan et al. | |
| 9,988,270 B2 | 6/2018 | Hojatie et al. | |
| 10,472,238 B2 | 11/2019 | Hojatie et al. | |
| 2002/0110511 A1 * | 8/2002 | Klingspor | B01D 53/18 423/243.08 |

* cited by examiner

CROSSFLOW SCRUBBING METHOD AND APPARATUS TO PRODUCE A PRODUCT SUCH AS POTASSIUM THIOSULFATE OR AMMONIUM THIOSULFATE

BACKGROUND

This invention pertains to a wet scrubbing method and apparatus but, more specifically, to a horizontally disposed multistage crossflow scrubbing method and apparatus to scrub sulfur dioxide gas or other gases in order to produce, for example, a thiosulfate of potassium or ammonium, which is commonly used as a fertilizer.

Sulfur dioxide pollution may result from crude oil refining, fossil fuel burning, flue-gas desulfurization, mining, waste incineration, sulfur burning operations, cement plants, pulp & paper mills, smelters, glass plants, biomass fired facilities, sulfuric acid plants, Claus plants and many other activities. Deleterious effects of sulfur dioxide ($SO_2$) emissions are minimized by sulfur scrubbers before being discharged into the atmosphere. Typical $SO_2$ scrubbers employ open spray towers that utilize liquid or slurry sprays, e.g., an aqueous bisulfite/sulfite solution, to initiate a first step in the desulfurization process in which sulfur dioxide gas is absorbed into or reacted with the liquid spray. A cation is typically added to the liquid for pH and reaction control. These towers employ a series of spray nozzles that spray incoming liquid against the direction of flow of the gas stream where the liquid falls into a sump and is continuously recirculated to the spray nozzles to increase absorption and/or reaction. The liquid in the sump may be siphoned off and reacted with other chemicals to produce a chemical byproduct such as thiosulfate of potassium or ammonium.

In a typical desulfurization plant, a liquid-to-gas, or L/G, ratio in the spray tower conventionally runs around 120 gallons per minute (gpm) liquid flow per 1,000 actual cubic feet per minute (acfm) gas, which ratio is dependent upon the scrubber type and the concentration of $SO_2$ in the flue gas. Some of these scrubber towers may be equipped with a plastic or metal packing to enhance gas-liquid contact but this imposes certain constraints on plant operation and efficiency such as cooling requirements, scale removal and cleaning, flow restrictions and pressure drop, safety, maintenance and labor costs, etc.

Rather than using a conventional tower (or multistage tower) construction, however, the present invention is directed to a horizontally disposed multistage crossflow scrubbing method and apparatus that efficiently scrubs a gas stream. The gas stream may comprise sulfur dioxide, ammonia or other gas but this disclosure exemplifies the invention with $SO_2$ gas. Exemplary prior art systems and methods include U.S. Pat. Nos. 10,472,238; 6,733,660; 4,408,593 and 4,170,546. As evident by the description below, horizontal scrubbing provides multiple advantages over a tower arrangement.

SUMMARY

According to a first aspect of the invention, there is provided a facility for scrubbing a toxic gas streaming from a gas source where the facility comprises a multi-section vessel having multiple horizontally disposed stages that scrub the gas or at least a portion of the gas prior to atmospheric discharge; a gas inlet disposed at a first stage of the multi-section vessel to receive the gas streaming from a gas source; a gas outlet disposed at a discharge stage of the multi-section vessel to discharge scrubbed gas to the atmosphere; and a scrubbing mechanism disposed at respective stages of the multi-section vessel to scrub at least a portion of the gas with a fluid as that gas passes from a preceding stage to a succeeding stage where the scrubbing mechanism comprises a gas contacting media such as a packing or mechanism to facilitate absorption by or reaction of gas with the fluid, a sump disposed at a lower portion of the output of the stage to receive the fluid as it flows into the sump, and a circulation pump to circulate the fluid from the sump to gas contacting media and to cascade at least a portion of the fluid to a preceding stage. The facility may include a reaction vessel that receives at least one reactive chemical along with fluid from at least one pump of the multi-section vessel to produce a product. A cooling water tower and a heat exchanger may be coupled in heat exchange relation with the fluid to cool circulating fluid in order to avoid heat damage to gas contacting media, if necessary.

In one embodiment, the gas is sulfur dioxide ($SO_2$) waste gas, the circulating liquid or fluid comprises potassium sulfite ($K_2SO_3$) and/or potassium bisulfite ($KHSO_3$), and the reactive chemical supplied to the reaction vessel is potassium hydroxide (KOH) whereby to produce potassium thiosulfate ($K_2S_2O_3$) in the reaction vessel. Sulfur may optionally be added to the reaction vessel during this process.

In another embodiment, the gas is sulfur dioxide ($SO_2$) waste gas, the circulating liquid or fluid is ammonium sulfite (($NH_4)_2SO_3$) and/or ammonium bisulfite ($NH_4HSO_3$), and the reactive chemical supplied to the reaction vessel is anhydrous ammonia in order to produce ammonium thiosulfate (($NH_4)_2S_2O_3$) in the reaction vessel. Sulfur may optionally be added to the reaction vessel during this process.

The invention also provides a method of wet-scrubbing a toxic waste gas, which method comprises providing a waste gas source; supplying and circulating a waste gas absorbing fluid in a primary vessel along with the waste gas; providing a multi-section vessel having multiple horizontally disposed stages where a preceding stage passes waste gas to a succeeding stage and where the multi-section vessel has a gas inlet disposed at a first stage thereof to receive waste gas from the primary vessel and a gas outlet disposed at a discharge stage of the multi-section vessel to discharge scrubbed waste gas to the atmosphere; successively scrubbing at least a portion of the waste gas passing from a preceding stage to a succeeding stage by a circulating fluid from a sump to a scrubbing section of the stage whereby to enable unreacted waste gas to react with fluid flowing over a gas contacting media; during the scrubbing step, cascading overflow fluid from a succeeding stage to a preceding stage and ultimately cascading the fluid back to the primary vessel; and extracting fluid from the primary vessel and supplying that fluid along with other chemicals to a reaction vessel in order to produce a product. The method may also include supplying a cation to the fluid to control the pH thereof, adding water to control specific gravity thereof, and/or controlling temperature of the fluid in any one or all of the stages.

In the primary vessel, the circulating fluid may be supplied or sprayed co-current, counter-current, perpendicular and/or in any direction relative to the direction of flow of the waste gas.

In yet a further embodiment of the invention, there is provided a method of scrubbing $SO_2$ gas from a streaming gas source to produce potassium thiosulfate as an end product wherein the method comprises supplying the sulfur dioxide ($SO_2$) gas to a primary vessel; circulating a liquid solution in the primary vessel from a sump to spray nozzles disposed in the primary vessel in order to spray liquid upon the $SO_2$ gas where the liquid solution comprises potassium sulfite or potassium bisulfite or a mixture thereof; providing a multi-section crossflow scrubber having a scrubbing mechanism disposed at multiple stages thereof that successively receive and scrub unreacted $SO_2$ gas from the primary vessel where the scrubbing mechanism comprises a gas contacting media to facilitate absorption by or reaction between the $SO_2$ gas and the liquid solution, a sump disposed at a lower portion of the output of the stage to receive liquid solution flowing from the gas contacting media, and a circulation pump to circulate the liquid solution from the sump to the gas contacting media as well as to cascade at least a portion of the fluid to a preceding stage and ultimately cascading the liquid solution to the primary vessel; supplying a cation to the liquid solution to control pH during circulation; and transferring a portion of the liquid solution to a reaction vessel along with potassium hydroxide and, optionally, sulfur in order to produce potassium thiosulfate. The cation may comprise potassium hydroxide or another substance. The method may include pH, temperature and specific gravity control of the liquid solution.

To produce ammonium thiosulfate $((NH_4)_2S_2O_3)$ as an end product, another embodiment of the invention comprises scrubbing $SO_2$ gas from a streaming gas source; supplying the sulfur dioxide $(SO_2)$ gas to a primary vessel; circulating a liquid solution in the primary vessel from a sump to spray nozzles that spray liquid upon the $SO_2$ gas where the liquid solution comprises ammonium sulfite $((NH_4)_2SO_3)$ and/or ammonium bisulfite $(NH_4HSO_3)$ or a mixture thereof; providing a multi-section crossflow scrubber having a scrubbing mechanism at multiple stages thereof that successively receive and scrub unreacted $SO_2$ gas flowing from the primary vessel where the scrubbing mechanism comprises a gas contacting media to facilitate absorption by or reaction between the $SO_2$ gas and the liquid solution, a sump disposed at a lower portion of the output of the stage to receive liquid solution flowing from the gas contacting media, and a circulation pump to circulate the liquid solution from the sump to the gas contacting media and to cascade at least a portion of the fluid to a preceding stage and ultimately cascading the liquid solution to the primary vessel; supplying a cation to the liquid solution to control pH during circulation; and transferring at least a portion of the liquid solution to a reaction vessel along with anhydrous ammonia and, optionally, sulfur in order to produce ammonium thiosulfate. The cation may comprise anhydrous ammonia and the fluid may also be pH-, temperature- and density-controlled.

The invention provides many advantages and benefits over the prior art including higher efficiency in removing particulate and gaseous contaminates from gases discharged into the atmosphere with a lower Liquid/Gas (L/G) ratio. Moreover, the horizontal scrubbing mechanism enables handling of different chemistries within the same vessel while performing as a more efficient gas contacting device and almost completely removing particulates and noxious gases prior to being emitted to atmosphere. The vessel enables easier manipulation of operating conditions as it has independently controlled stage inlets (e.g., packing irrigation) and outlets to increase or decrease performance and to remove liquids. There is no requirement for gas filter vessels as the discharge of final stage is designed to remove particulates from the gas stream, thus there's no potential for tail gas filter damage or any need to periodically risk plant shut down or stack emission failure due to filter cage or filter media replacement. The invention improves safe operation standards by eliminating the need to enter confined space of a gas filter housing to perform maintenance or to clear blockage and rinse filters while being exposed to acidic atmospheres potentially causing inhalation and burn hazards. Media incorporated in the proposed invention can be cleaned in place or easily removed from the vessel for inspection without exposing personnel to hazardous work environments. Design of invention eliminates unwanted liquid particles and also eliminates potential stack spitting of corrosive compounds.

Other aspects and advantages of the invention will become apparent upon review of the following description taken in connection with the accompanying drawings. The invention, though, is pointed out with particularity by the appended claims.

DESCRIPTION OF ILLUSTRATIVE EMBODIMENTS

The illustrated embodiments described below entail production of potassium sulfite and potassium bisulfite from sulfur dioxide gas in order to produce potassium thiosulfate, on one hand, or production of ammonium sulfite and ammonium bisulfite from a sulfur dioxide gas in order to produce ammonium thiosulfate, on the other hand. These end products are conventionally used as fertilizers. Three to five scrubber stages should be sufficient to achieve low exhaust gas ppm emission when scrubbing $SO_2$, for example. The multistage crossflow scrubber, however, may be used with other gases to produce other products.

It should be noted that rather than producing a thiosulfate fertilizer from $SO_2$ gas directly in tower equipment, potassium or ammonium sulfite/bisulfite are produced from the $SO_2$ gas as precursors to the production of thiosulfate fertilizers using a cross-flow scrubber. The thiosulfate fertilizer is subsequently produced in a reaction vessel using the precursors along with other chemicals. The $SO_2$-containing gas can come from any type of chemical plant that produces $SO_2$ gas including but not limited to refinery acid gas, Claus Tail gas, sulfur burners, or mining operations.

Figure 1A:
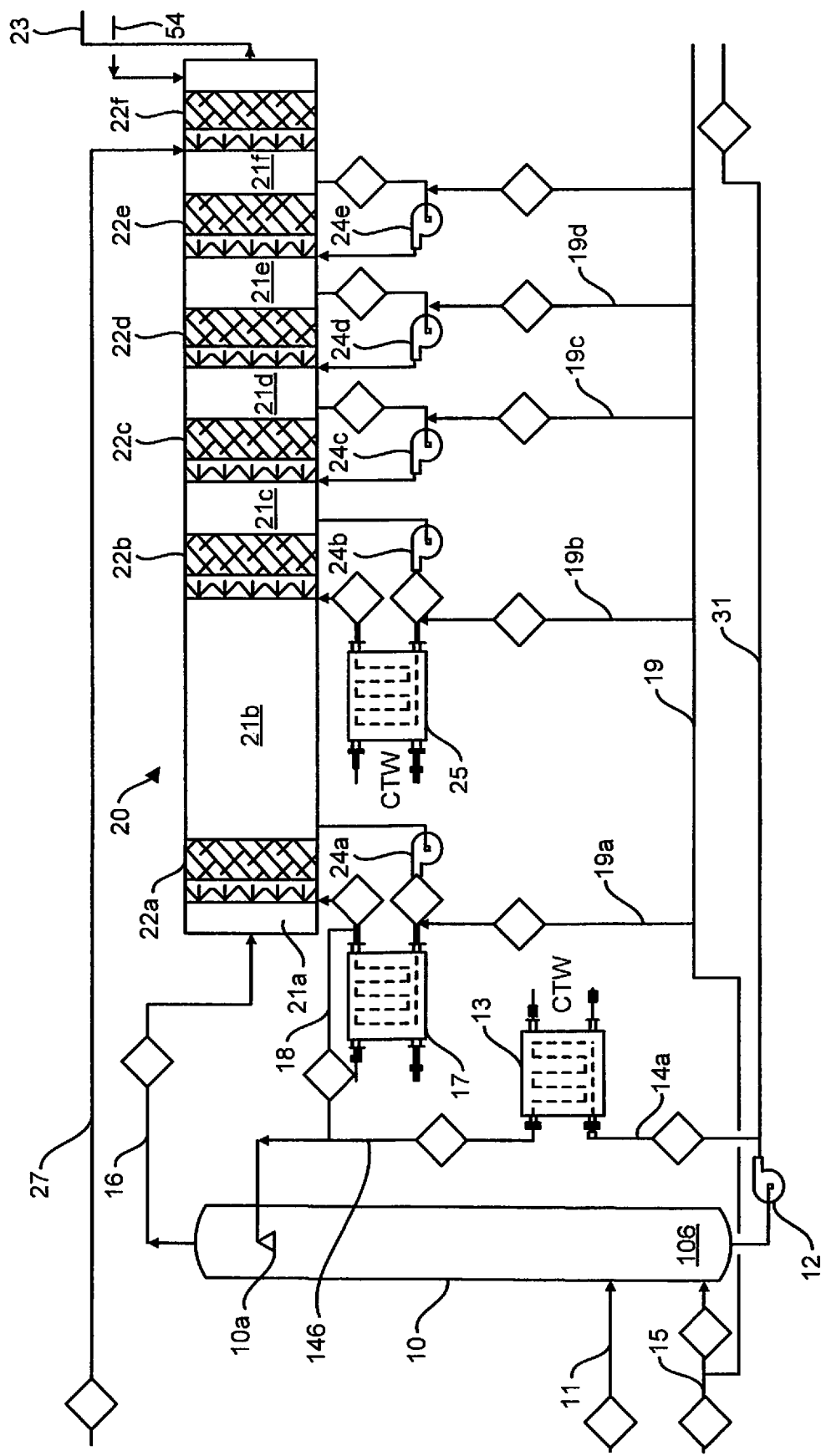
FIG. 1A depicts a front end of an exemplary chemical processing plant or facility that receives a sulfur dioxide gas stream in a first vessel or tower and that scrubs the gas in a series of horizontal scrubber sections.
Figure 1B:
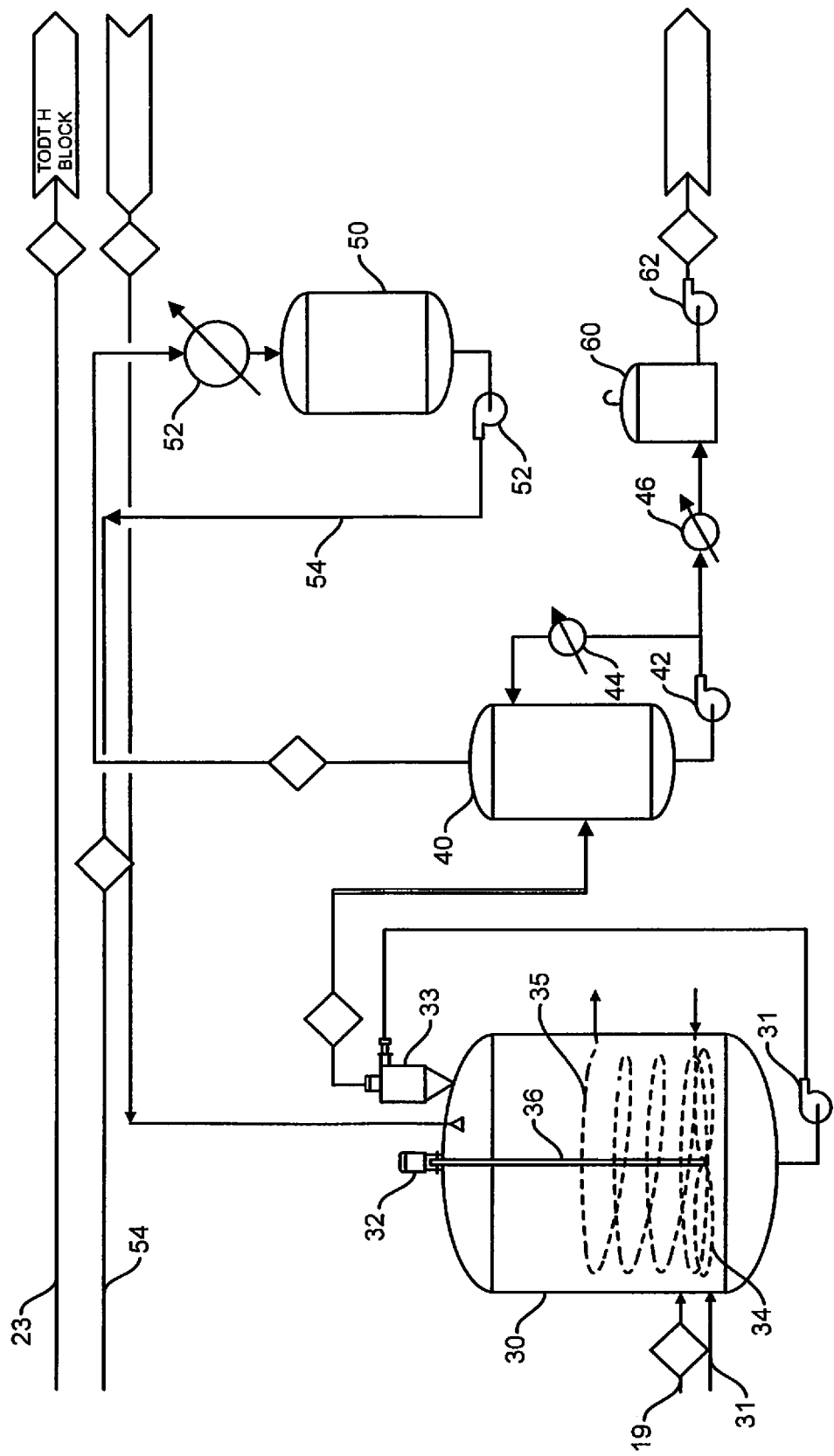
FIG. 1B shows the back end of the processing plant or facility of FIG. 1A including a reaction vessel for producing a substance such as a thiosulfate of potassium or ammonium and, in addition, a number of plant control elements to help control concentration of the thiosulfate solution as well as other components of the processing plant.

FIGS. 1A and 1B show an exemplary plant layout of a crossflow scrubber according to as aspect of the present invention. The illustrated embodiment is designed to produce a liquid-based potassium thiosulfate or ammonium thiosulfate. Principal components of the plant or facility include a primary vessel 10 that receives a source of $SO_2$ gas, a multistage crossflow scrubber 20 having gravity-fed circulatory pumps in respective stages thereof, a reaction vessel 30 for converting a sulfite/bisulfite solution from primary vessel 10 into a thiosulfate solution, an evaporator 40 to control concentration of the thiosulfate solution, a condensation tank 50 that supplies water as needed to various parts of the plant or facility, and a day tank 60 for storing the thiosulfate solution. The thiosulfate solution can be potassium thiosulfate or ammonium thiosulfate depending on the desired fertilizer sought to be produced. The circulating water-based solution can be either ammonium sulfite (($NH_4$)$_2SO_3$) and/or ammonium bisulfite ($NH_4HSO_3$) if producing ammonium thiosulfate (($NH_4$)$_2S_2O_3$) as a fertilizer, or potassium sulfite ($K_2SO_3$) and/or potassium bisulfite ($KHSO_3$) if producing potassium thiosulfate ($K_2S_2O_3$) as a fertilizer.

In operation, $SO_2$ gas streaming from a source enters primary vessel 10 via conduit 11 where the gas is absorbed by and/or reacted with the liquid solution of potassium sulfite and/or potassium bisulfite circulated through vessel 10 via spray nozzles 10a and circulation pump 12. In this primary stage, vessel 10 converts about 70-90% of $SO_2$ gas into a sulfite/bisulfite mixture with some sulfates depending on the pH and oxygen concentration of incoming gas. Advantageously, vessel 10 contains no packing or other elements requiring cleaning or maintenance. Spray nozzles 10a, however, require periodic maintenance. Vessel 10 also removes heat and condenses some water. During circulation of the sulfite/bisulfite solution in vessel 10, a cation such as potassium hydroxide or anhydrous ammonia may be added to vessel 10 via conduit 15 in order to increase the concentration of the solution, which settles in a sump 10b located at a lower portion of vessel 10. The cation helps control pH of the sulfite/bisulfite solution circulating in vessel 10. Gravity fed pump 12 circulates the cation and sulfite/bisulfite solution from sump 10b of vessel 10 via conduit 14a and returns the liquid solution to an upper portion of vessel 10 via conduit 14b where nozzles 10a spray the liquid against the direction of gas flow in vessel 10 to absorb and react with incoming $SO_2$ gas. As the liquid falls through vessel 10, it absorbs heat and reacts with the upflowing $SO_2$ gas stream to convert some of the gas to potassium sulfite/potassium bisulfite when producing potassium thiosulfate ($K_2S_2O_3$) as an end product, or ammonium sulfite/ammonium bisulfite when producing ammonium thiosulfate (($NH_4$)$_2S_2O_3$) as an end product. Spray nozzles 10a or other liquid dispersion mechanisms need not necessarily spray liquid against the direction of gas flow, but instead, may disperse or spray the liquid in any direction relative to the direction of gas flow in vessel 10. Further, the addition of cation (e.g., potassium hydroxide or anhydrous ammonia) to vessel 10 at this point of operation does not produce any fertilizer product, e.g., potassium thiosulfate or ammonium thiosulfate.

Heat exchanger 13 interposed between conduits 14a and 14b cools the circulating sulfite solution, which removes the heat from reaction, cation dilution and the hot $SO_2$ gas stream upflowing through vessel 10. The heat exchanger enables greater reaction efficiency and also may help cool the liquid to protect any plastic or other packing employed in subsequent stages of the crossflow scrubber. Cooling water is conventionally supplied and circulated through heat exchanger 13 to cool the circulating liquid solution, as needed. Automated temperature controls also may be implemented as known in the art. This enables attainment and maintenance of an optimum reaction temperature in vessel 10 for conversion of $SO_2$ gas into a sulfite/bisulfite of potassium or ammonia.

Unreacted $SO_2$ gas exits an upper stack of vessel 10 via conduit 16 and continues through multiple stages of a crossflow scrubber 20. Pump 12 pumps a portion of the liquid containing sulfite/bisulfite mixture and absorbed/reacted $SO_2$ gas from primary vessel 10 to a downstream daytank that feeds reactor vessel 30. In a typical arrangement, the amount of liquid withdrawn by pump 12 and sent to a day tank that feeds reactor vessel 30 may range from less than 1% to 10%, more or less, of the liquid recirculated in vessel 10. Line 27 provides a freshwater feed to the crossflow scrubber 20 to replenish liquid drained from the primary vessel via pump 12 and/or to maintain a specific gravity of the liquid between 1.25 and 1.45, more or less. Crossflow scrubber 20 converts unreacted $SO_2$ gas into the sulfite/bisulfite solution. Scrubber 20 is partitioned into multiple stages so that greater conversion occurs in a first stage 21a thereof by reducing the concentration of $SO_2$ in the gas as it flows to the next stage 21b and towards to final stage 21f of the scrubber. At the final stage 21f, any unreacted $SO_2$ gas leaving scrubber 20 will have low enough levels of $SO_2$ to emit directly to the atmosphere through a vent stack connected to conduit 23. The final stage 21f of the scrubber also functions as a mist eliminator for the vented gas stream.

Initially, the unreacted $SO_2$ gas enters a first stage 21a of the multi-section crossflow scrubber 20 and proceeds through a series of gas contacting media, such as packing 22a, 22b, 22c, 22d, 22e and 22f that facilitate the absorption/reaction process. A gravity-fed pump 24a of the first stage recirculates a certain amount of liquid sulfite solution from a sump of stage 21a back to the packings 22a of stage 21a so as to further scrub unreacted $SO_2$ gas. At the same time, a cation such as potassium hydroxide (or anhydrous ammonia if producing ammonium thiosulfate as an end product) is supplied to the recirculating liquid in an amount to maintain a pH range in primary vessel 10 of 3.0 to 6.0, more or less. A portion of the liquid returning to stage 21a is routed back to the spray nozzles 10a of primary vessel 10 via conduit 18, which couples to conduit 14b. Heat exchanger 17 cools the circulating liquid to maintain a temperature below a critical level in order to protect the plastic or other temperature-sensitive packing 22a of the first stage 21a of the multi-section crossflow scrubber. Cooling water is conventionally supplied to heat exchanger 17 as known in the art. Instead of providing plastic or other temperature-sensitive packing as a gas contacting media, the packing may comprise a stainless steel or high-temperature plastic material. Moreover, the gas contacting media need not comprise a solid material but simply may comprise liquid mist or droplets of the circulating fluid that are momentarily suspended or flowing through the confines of scrubber 20. In this case, spray nozzles may also be deployed in various sections of multi-section crossflow scrubber 20.

Unreacted $SO_2$ gas in scrubber stage 21b passes to scrubber stage 21c through packing 22b of scrubber 21b, which also has a sump at a lower section thereof. Gravity-fed pump 24b recirculates liquid from sump of stage 21b back to packing 22b. The return circulation path of the liquid passes through a heat exchanger 25, which receives cooling tower water in order to cool the recirculating liquid. By the time the liquid reaches the second stage 22b of the crossflow scrubber, the liquid is sufficiently cooled below the plastic packing damage temperature so that the later stages do not require heat exchangers for further cooling. During recirculation of the liquid from the output of the second stage 21b to the input of the first stage 21a, a cation such as potassium hydroxide (or anhydrous ammonia if producing ammonium thiosulfate) may also be added via conduit 19b to control pH of the circulating sulfite and bisulfite solution. This process is successively repeated until unreacted $SO_2$ gas reaches the final stage and vents to the atmosphere. Each scrubber stage 21a, 21b, 21c, 21d and 21e successively scrubs the unreacted $SO_2$ gas as it flows from one stage to a next stage thereby lowering its concentration at each stage.

The multi-section, multistage crossflow arrangement advantageously provides more convenient ground-level plant maintenance and, in addition, the number of stages in the crossflow scrubber also may be chosen or utilized to meet any $SO_2$ emission or scrubbing requirement. The number of stages or sections in the crossflow scrubber may range from a couple of stages to more than a few stages but three to five stages are adequate for the illustrated embodiment.

The sulfite or bisulfite solution of sump stage 21a (and/or other stages) may be automatically monitored by instrumentation for pH and specific-gravity and forwarded to the primary vessel 10. Specific gravity may be controlled by adding water and pH is controlled by adding a cation.

The sulfite/bisulfite solution is then forwarded to continuously stirred reactor 30 via conduit 31 where it is reacted with additional potassium hydroxide (KOH) to produce potassium thiosulfate or ammonium hydroxide to produce ammonium thiosulfate. Sulfur may also be added. Motor 32 drives impellers 34 through a shaft 36 to provide continuous stirring of vessel contents.

Sulfite/bisulfite solution from a day tank is fed to continuously stirred reaction vessel 30 along with molten sulfur and a cation to produce the thiosulfate. In one embodiment, potassium hydroxide (KOH) plus additional sulfur is added to the reaction vessel 30 to produce potassium thiosulfate. In another embodiment, anhydrous ammonia plus additional sulfur is added to the reaction vessel 30 to produce ammonium thiosulfate. A heat transfer coil 35 submersed in the stirred liquid maintains a desired reaction temperature and functions to remove heat of reaction and/or the heat of dilution of cation. During production, the reaction temperature in vessel 30 is selected for optimum reaction. Pump 31 recirculates the liquid contents of the reaction vessel 30 through a hydroclone 33, which captures sulfur particles and returns them to the vessel. Liquid overflow of hydroclone 33 is the discharge point of the liquid from the reactor to extract a thiosulfate of potassium or ammonium. The extracted thiosulfate is sent to an evaporator vessel 40 to remove excess water if necessary to strengthen the final product to a desired concentration, typically a specific gravity of around 1.46 and a pH of about 7.0 to 9.0 for potassium thiosulfate, and a specific gravity of 1.32 to 1.35 and pH of 6.5 to 8.5 for ammonium thiosulfate, A water tank 50 receives water vapor from evaporator vessel 40 via a condenser 52, which drains condensed water into water tank 50. Via conduit 54, pump 52 sends water from tank 50 back to various part of the scrubber 20, as needed, or to other water consuming equipment in the plant or facility. Pump 42 recirculates the thiosulfate mixture to maintain homogeneity of the solution. During such circulation, evaporator 42 removes excess water from the thiosulfate solution, as desired.

Pump 42 also feeds the thiosulfate solution to day tank 60. This solution is cooled, as necessary, by a cooler 46 before being pumped to day tank 60. Day tank 60 provides temporary storage of the thiosulfate product. Samples from day tank 60 are used to check the concentration of the thiosulfate product made in reactor 30 after it has been cooled. When the thiosulfate solution attains desired properties, a pump 62 transfers the solution to permanent product storage.

As explained above, the invention may be deployed with other gases and other chemical products besides sulfur dioxide ($SO_2$), ammonium thiosulfate (($NH_4$)$_2S_2O_3$) or potassium thiosulfate ($K_2S_2O_3$). The illustrated facility may also take on other forms or configurations. For example, the multi-section crossflow scrubber may comprise a single partitioned vessel or it may comprise multiple separate vessels interconnected by conduits, piping or passages. The number of stages may vary from a couple of stages to more than a few stages depending on the extent of scrubbing required and/or the type of gas being scrubbed as well as legally required discharge tolerances for pollution control. The primary vessel may stand alone as a separate and independent vessel or tower, or it may be configured as part of the crossflow scrubber. Pumps may be ganged with common drive motors and relative positions of various sections and stages may be rearranged via conduits and piping to achieve the same or similar results. Temperature, pH and density control may be implemented at points in the plant other than the locations shown or described herein. Fluid recirculation may occur between contiguous or non-contiguous stages of the multi-section vessel. Gas contacting material disposed at any one of the stages of the multi-section vessel, if used, may take on many forms such as metal, high-temperature plastic or conventional plastic. Fluid may be extracted or withdrawn at any point of the facility and fed to the reaction vessel to produce a product. Water may be added or extracted/condensed at any liquid fluid circulation point of the plant or facility in order to control specific gravity of the circulating fluid. Fluid may comprise a gas, i.e., a scrubbing gas or scrubbing substance, other than the gas being scrubbed. Scrubbing mechanisms may be disposed at each stage or only at some stages of the multi-section vessel.

Internal workings of the scrubbing mechanisms may also depart from the illustrated embodiment. The scrubbing mechanism may or may not include a packing material. In some cases, it may only be necessary to provide spray nozzles or other devices in the scrubber stages of the multi-section scrubber to successively and sufficiently scrub the gas. Thus, the gas contacting media may simply comprise fluid mist or droplets suspended or flowing in gas within the confines of the vessel. The above variations apply to both method and apparatus aspects of the invention.

Accordingly, the inventions defined by the appended claims embrace the above and other modifications and adaptations that may come to a person skilled in the art based on the teachings herein.

We claim:

1. A facility for scrubbing gas streaming from a gas source, said facility comprising:
   (a) a multi-section vessel having multiple horizontally disposed stages where a preceding stage passes gas to a succeeding stage;
   (b) a gas inlet disposed at a first stage of the multi-section vessel to receive gas streaming from said source;
   (c) a gas outlet disposed at a discharge stage of the multi-section vessel to discharge scrubbed gas to the atmosphere; and
   (d) a scrubbing mechanism disposed at respective stages of the multi-section vessel to scrub at least a portion of the gas with a fluid as the gas passes from a preceding stage to a succeeding stage, each said scrubbing mechanism comprising a gas contacting media to facilitate absorption by or reaction of the gas with the fluid, a sump disposed at a lower portion of said stage to receive the fluid as it flows from the gas contacting media, and a circulation pump to circulate the fluid within the stage and to cascade at least a portion of the fluid to said preceding stage.

2. The facility of claim 1, further including a reaction vessel for use in producing a product by reacting said fluid with a reactive chemical.

3. The facility of claim 2, wherein said gas contains unwanted heat and the facility further comprises a cooling water tower and a heat exchanger coupled in heat exchange relation with the gas in order to remove unwanted heat, said heat exchanger being disposed in a fluid path of at least one of said stages of said multi-section vessel to cool circulating fluid.

4. The facility of claim 2, wherein said gas contacting media comprises a packing material, said gas source contains sulfur dioxide ($SO_2$), said fluid comprises at least one of potassium sulfite ($K_2SO_3$) and potassium bisulfite ($KHSO_3$), and said reactive chemical supplied to said reaction vessel comprises a combination of potassium hydroxide (KOH) and sulfur whereby to produce potassium thiosulfate ($K_2S_2O_3$) as said product.

5. The facility of claim 2, wherein said gas contacting media comprises a packing material, said gas source contains sulfur dioxide, said fluid comprises at least one of ammonium sulfite (($NH_4)_2SO_3$) and ammonium bisulfite ($NH_4HSO_3$), and said reactive chemical supplied to said reaction vessel comprises a combination of anhydrous ammonia and sulfur in order to produce ammonium thiosulfate (($NH_4)_2S_2O_3$) as said product.

6. The facility of claim 2, wherein said reaction vessel includes a continuous stirring mechanism to maintain homogeneity of fluid contained therein.

7. The facility of claim 6, wherein said reaction vessel further includes a heat exchanger adapted for submersion in the fluid of said reaction vessel in order to control reaction within the fluid.

8. A method of wet-scrubbing a toxic waste gas before discharging to an atmosphere, said method comprising:
(a) supplying a source of waste gas to a primary vessel;
(b) circulating a waste gas absorbent or reactant fluid in said primary vessel that contacts the waste gas;
(c) providing a multi-section vessel having multiple horizontally disposed stages where a preceding stage passes waste gas to a succeeding stage, said multi-section vessel having a gas inlet disposed at a first stage thereof to receive waste gas from said primary vessel and a gas outlet disposed at a discharge stage of the multi-section vessel to discharge scrubbed waste gas to the atmosphere;
(d) scrubbing at least a portion of the waste gas passing from a preceding stage to a succeeding stage by circulating fluid from a sump to a gas contacting media of said stage whereby to enable unreacted waste gas to react with said fluid; and
(e) during said scrubbing step, cascading overflow fluid from a succeeding stage to a preceding stage and ultimately cascading said fluid back to said primary vessel.

9. The method of claim 8, further including supplying a cation to said fluid to control the pH thereof.

10. The method of claim 9, further including controlling temperature of said fluid with cooling water.

11. The method of claim 8, further including extracting fluid during circulation to produce a product from extracted fluid and adding water during circulation to replenish extracted fluid.

12. A method of scrubbing $SO_2$ gas from a streaming gas source to produce potassium thiosulfate ($K_2S_2O_3$), said method comprising:
(a) supplying the streaming gas source containing sulfur dioxide ($SO_2$) gas to a primary vessel;
(b) circulating a liquid solution in the primary vessel from a sump to spray nozzles disposed in said primary vessel in order to contact sprayed liquid with the $SO_2$ gas where said liquid solution comprises at least one of potassium sulfite ($K_2SO_3$) and potassium bisulfite ($KHSO_3$);
(c) providing a multi-section crossflow scrubber having a scrubbing mechanism disposed at multiple stages thereof for receiving and scrubbing unreacted $SO_2$ gas from the primary vessel, each said scrubbing mechanism comprising a gas contacting media to facilitate absorption by or reaction between said $SO_2$ gas and the liquid solution, a sump disposed at a lower portion of a stage of said scrubbing mechanism to receive liquid solution from the gas contacting media, and a circulation pump to circulate said liquid solution from said sump to the gas contacting media as well as cascading at least a portion of the liquid solution to a preceding stage and ultimately cascading the liquid solution to the primary vessel;
(d) supplying a cation to the liquid solution to control pH during circulation; and
(e) transferring at least a portion of the liquid solution to a reaction vessel along with potassium hydroxide (KOH) and, optionally, sulfur to produce potassium thiosulfate ($K_2S_2O_3$) in said reaction vessel.

13. The method of claim 12, wherein the cation of the supplying step comprises at least one of potassium hydroxide, sodium hydroxide and sodium carbonate to make sodium bisulfite.

14. The method of claim 12, wherein said gas contacting media comprises a packing material.

15. The method of claim 12, further including condensing or adding water to the liquid solution during circulation in order to control specific gravity of the liquid solution.

16. The method of claim 12, further comprising controlling temperature of the liquid solution during circulation in order to increase efficiency of reaction or to protect temperature-sensitive elements.

17. The method of claim 12, further comprising controlling pH during the circulation of the liquid solution.

18. The method of claim 12, further comprising venting unreacted $SO_2$ gas from the multi-section scrubber to atmosphere at an $SO_2$ level below a maximum allowable limit.

19. The method of claim 12, further including continuously stirring the liquid solution in the reaction vessel to maintain homogeneity of the liquid solution contained therein.

20. The method of claim 12, further including controlling temperature of the liquid solution in said reaction vessel from about 125 to 250 degrees Fahrenheit in order to control reaction within the liquid solution.

21. A method of scrubbing $SO_2$ gas from a streaming gas source to produce ammonium thiosulfate (($NH_4)_2S_2O_3$), said method comprising:
(a) supplying the streaming gas source containing sulfur dioxide ($SO_2$) gas to a primary vessel;
(b) circulating a liquid solution in the primary vessel from a sump to spray nozzles that spray liquid to contact the $SO_2$ gas in the vessel where said liquid solution comprises at least one of ammonium sulfite (($NH_4)_2SO_3$) and ammonium bisulfite ($NH_4HSO_3$);
(c) providing a multi-section crossflow scrubber having a scrubbing mechanism disposed multiple stages thereof for receiving and scrubbing unreacted $SO_2$ gas flowing from the primary vessel, each said scrubbing mechanism comprising a gas contacting media to facilitate absorption by or reaction between said $SO_2$ gas and the liquid solution, a sump disposed at a lower portion of said scrubbing mechanism to receive liquid solution from gas contacting media, and a circulation pump to circulate liquid solution within said stage and to cascade at least a portion of the liquid solution to a preceding stage and ultimately to the primary vessel;
(d) supplying a cation to the liquid solution to control pH during circulation; and
(e) transferring a portion of the circulating liquid solution to a reaction vessel along with anhydrous ammonia and, optionally, sulfur in order to produce ammonium thiosulfate (($NH_4)_2S_2O_3$).

22. The method of claim 21, wherein the cation of said supplying step comprises one of ammonium hydroxide and anhydrous ammonia.

23. The method of claim 21, wherein said gas contacting media comprises a packing material.

24. The method of claim 21, further including condensing or adding water to the liquid solution during circulation in order to control specific gravity of the liquid solution.

25. The method of claim 22, further comprising controlling temperature of the liquid solution during circulation in order to control efficiency of reaction.

26. The method of claim 23, further comprising controlling pH during the circulation of the liquid solution.

27. The method of claim 25, further comprising venting $SO_2$ gas from a stage of the multi-section scrubber to atmosphere at an $SO_2$ level below a maximum allowable limit.

28. The method of claim 21, further including continuously stirring the liquid solution in the reaction vessel to maintain homogeneity of the liquid solution.

29. The method of claim 21, further including controlling temperature of the liquid solution in said reaction vessel from about 125 to 250 degrees Fahrenheit in order to control reaction within the liquid solution.

* * * * *